United States Patent [19]

Matsubara et al.

[11] Patent Number: 5,696,542
[45] Date of Patent: Dec. 9, 1997

[54] INK JET RECORDING METHOD

[75] Inventors: Miyuki Matsubara, Tokyo; Hiromitsu Hirabayashi, Yokohama; Shigeyasu Nagoshi, Kawasaki; Noribumi Koitabashi, Yokohama; Hitoshi Sugimoto, Kawasaki; Fumihiro Gotoh, Yokohama; Masaya Uetuki, Kawasaki, all of Japan

[73] Assignee: Canon Kabushiki Kaisha, Tokyo, Japan

[21] Appl. No.: 149,762

[22] Filed: Nov. 10, 1993

[30] Foreign Application Priority Data

Nov. 12, 1992 [JP] Japan .................. 4-302547

[51] Int. Cl.⁶ .................................. B41J 29/38
[52] U.S. Cl. .................................. 347/12; 347/40
[58] Field of Search .................. 347/9, 40, 41, 347/43, 12, 180, 181, 182, 37, 15

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,540,996 | 9/1985 | Saito ................ 347/43 |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,748,453 | 5/1988 | Lin et al. ............... 347/224 |
| 4,967,203 | 10/1990 | Doan et al. ............. 347/41 |
| 4,999,646 | 3/1991 | Trask ................... 347/41 |
| 5,359,355 | 10/1994 | Nagashi et al. ......... 347/40 |

FOREIGN PATENT DOCUMENTS

| | | | |
|---|---|---|---|
| 54-056847 | 5/1979 | Japan . | |
| 55-113573 | 9/1980 | Japan . | |
| 58-194541 | 11/1983 | Japan . | |
| 59-123670 | 7/1984 | Japan . | |
| 59-138461 | 8/1984 | Japan . | |
| 60-071260 | 4/1985 | Japan . | |
| 60-107975 | 6/1985 | Japan . | |
| 401026260 | 1/1989 | Japan ................. 347/34 |
| WO917340 | 10/1992 | WIPO . | |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A recording head having a plurality of ink discharge element lines arranged thereon is moved in a direction different from the direction of arrangement of the ink discharge elements to conduct a main scan, and at the end of the main scan, a recording medium is moved by a predetermined width in a direction different from the main scan direction to record an image. A record area of the recording head is divided into a plurality (n) of areas and each unit image area on the recording medium is main scanned n times by using the n divided areas of the recording head and thinned images with a print factor of 1/n are sequentially recorded to complete the record of the unit image area. The print factor for the pixels in the boundary area of adjacent unit image areas is lower than the print factor to the entire unit image area in at least one of the n main scans. Thus, the number of pixels recorded by the same main scan in the boundary area is increased. A high quality image without a joint stripe is attained even for a recording medium having a relatively high ink absorption speed.

10 Claims, 12 Drawing Sheets

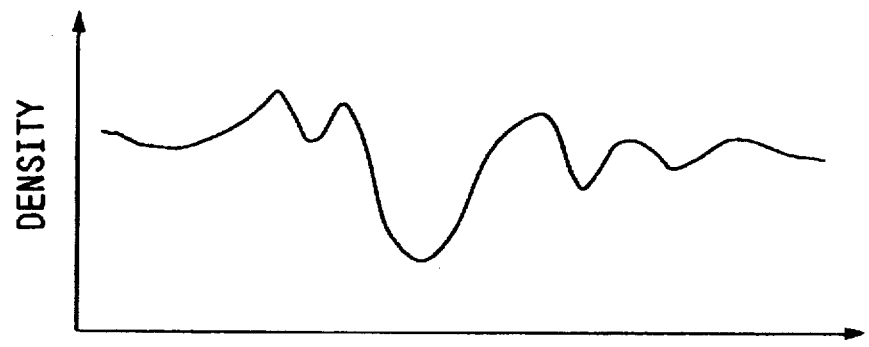
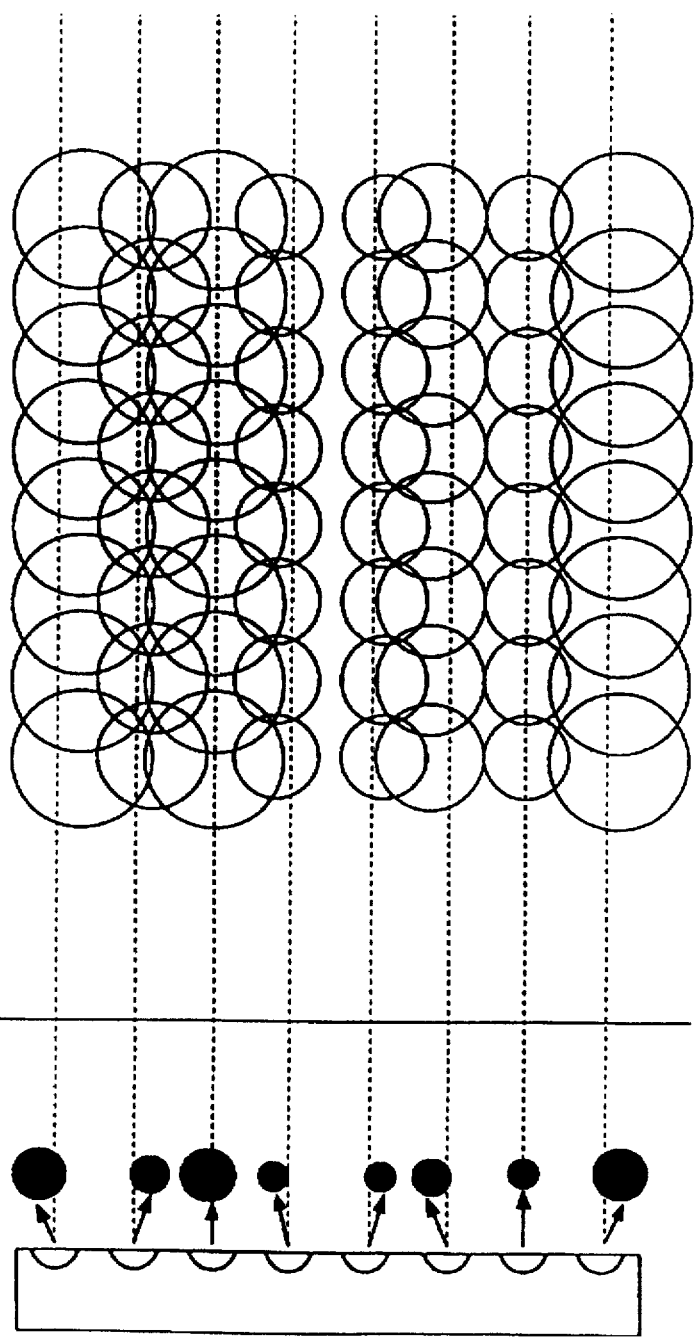

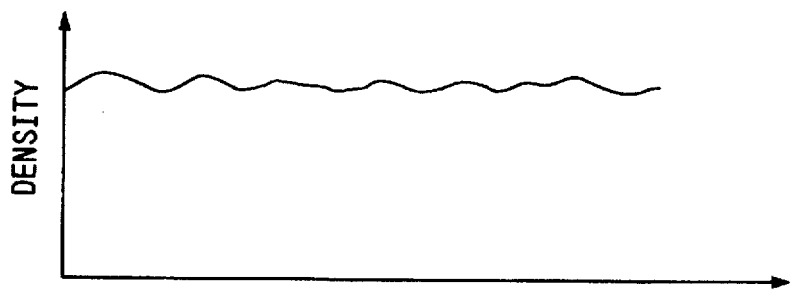
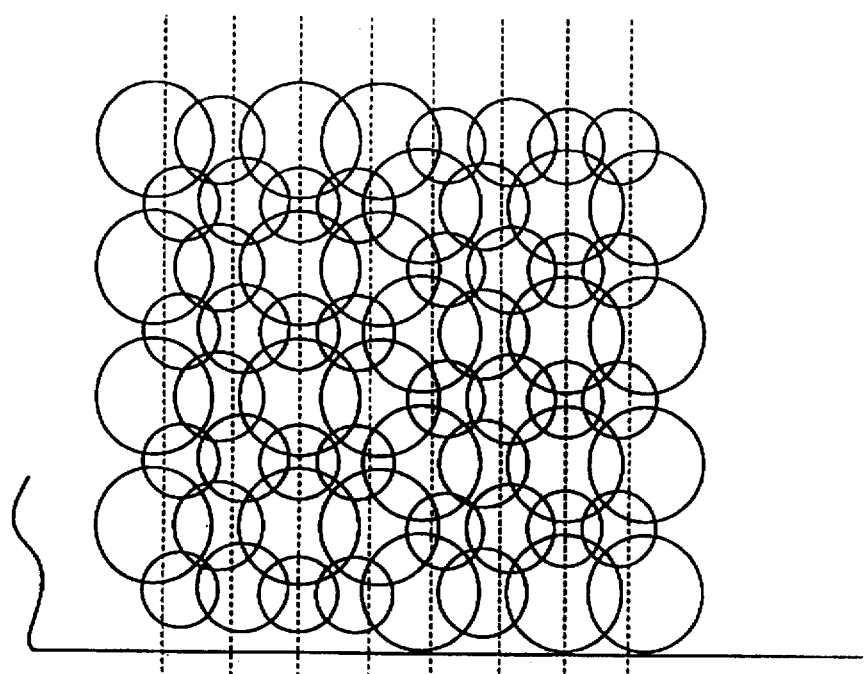
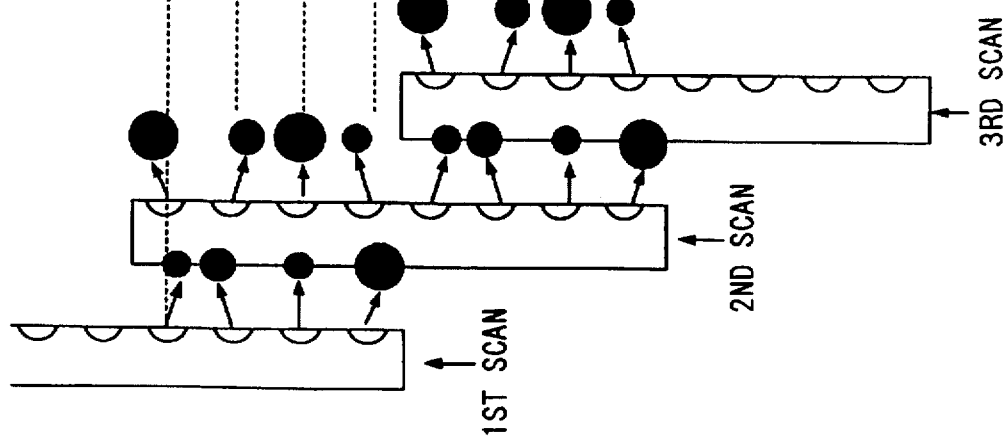

⊘ CHECKER

○ REVERSE CHECKER

INK JET RECORDING METHOD

BACKGROUND OF THE INVENTION

1. Field of the Invention

The present invention relates to an ink jet recording method.

2. Related Background Art

As a copying machine and an information processing equipment such as a word processor and a computer as well as a communication apparatus have become common, it is rapidly becoming popular to record a digital image by using a recording head of an ink jet system as an image forming (recording) apparatus therefor. In such a recording apparatus, an integration of a plurality of ink discharge ports and ink paths is used as a recording head having a plurality of recording elements integrally arranged in order to improve a recording speed. Recently, an apparatus having a plurality of such recording heads is used to comply with color recording.

In such an ink jet printer, a recording head having a predetermined recording width is moved along a main scan direction, and after the main scan, a sheet is fed in a sub-scan direction to record an image.

In a printer thus constructed, a discharge precision of a nozzle in the recording head or a sheet feed precision which is done for each record scan is required to some extent. The scatter in the amount of discharge and the direction of discharge in the recording head appears as irregularity of density in each record area, and the scatter in the amount of sheet feed causes a black stripe or a white stripe at a junction of the record areas.

However, as higher and higher quality of image is required for a recent recording apparatus, it is difficult to perfectly control those factors and a recording method which makes those factors unobstructive without completely eliminating those factors has been proposed. Further, it is required to comply with recording media of various qualities such as plain papers, coated papers and OHP's and recording methods suitable for the respective recording media are required.

In the recording medium such as the coated paper and the plain paper which are designed to relatively quickly absorb ink on the surface, the jointing stripe which is one of the image troubles frequently appears as a black stripe. This is explained below.

In case of the coated paper, droplets of different colors which are simultaneously recorded do not mix with each other and a spread-free high resolution image is formed. However, in this type of paper, a density easily changes with an ink impact/absorption timing. FIG. 8A shows the impact/absorption of a given volume of ink by a paper plane, and FIG. 8B shows the impact/absorption of the same volume of ink at two separate times. They show that the ink more readily remains on the paper surface and the surface density is higher when it is recorded with a smaller volume at separate times. The same phenomenon appears at the joint area of the record scans.

FIG. 8C shows a manner in which a record is completed in two image areas in two scans. Since the impacted ink dot is always designed to be larger than one pixel area, two or more dots overlap at each area. In the joint area (or connection section), the swelled-out area is split into two scans and recorded at different times so that it forms a darker stripe than other area although the volume of ink impacted is same as that of the other area. Further, the time interval of the record scans is not always constant due to the data transfer time and the recovery time of the recording apparatus. If the recording head stands by data at a home position after the completion of certain record scans, the density of the joint area increases more and more and the image quality is further deteriorated. The irregularity of density which appears at the carriage rest is called a rest irregularity.

In the above description, only one head record scan is conducted for each print area to complete the image. However, in order to solve all of the above problems, the recording in the image area may be divided into a plurality of runs, as disclosed in the patent described below. Three patents which show background techniques of that patent are first explained.

In Japanese Laid-Open Patent Application No. 55-113573, only zig-zag patterns (or checker/reverse-checker patterns) arranged alternately in vertical and horizontal directions are printed in each scan, and an image is completed by forward and backward record scans. Adjacent dots are not continuously printed to prevent the adjacent dots from being printed before the printed dots are dried. In this manner, the dot distortion is prevented. In this patent application, the thinning mask is limited to the zig-zag pattern.

In the Japanese Laid-Open Patent Application No. 58-194541 filed by the assignee of the present invention, a plurality of recording element lines are parallelly arranged and they are reciprocally moved transversely to the lines of the recording elements to conduct the main scan of the dot matrix recording. In the forward path of the main scan, dots which are smaller in number than the total dots to be recorded in at least one of each row and each column of the record dot matrix are intermittently recorded, and in the backward run of the main scan, the remaining dots in at least one of each row and each column are intermittently recorded so that the order of overlap of the record in the overlapping dots by the record element lines differs between the forward run and the backward run of the main scan. Thus, the deterioration of image by the hue distortion (color irregularity) due to the overlapped printing of color inks is prevented. Since the primary object of this patent application is to avoid the hue distortion, there is no specific limitation to the bit positions recorded in each scan, and the horizontal thinning in which recording is made only vertically and alternately and the vertical thinning in which recording is made only horizontally and alternately are shown in addition to the zig-zag pattern.

U.S. Pat. No. 4,748,453 discloses a method which is specifically directed to a low ink absorption speed recording medium such as an OHP. Interpolating recording is made to pixels located at alternate positions in horizontal and vertical directions in one record area by first and second (or more) divided record scans to prevent the beading of the ink on the recording medium such as OHP. When a color image is to be formed, the order of ink impact of the mixed color pixels is reversed between the first scan and the second scan (reciprocal recording) so that the color banding (color irregularity) is prevented. Since the primary object of this patent is to prevent the beading of the pixels, the pixels to be recorded in one scan are alternate (non-adjacent) horizontally and vertically.

A common scheme to the above three patents is to complete the recording of the pixels of one image area in a plurality of record scans. In this case, since the ink of equal volume is dividedly absorbed by one image area, the record density of not only the joint area but also the entire image is enhanced and the joint area is rendered unobstructive to some extent, as shown in FIGS. 8A and 8B. Further, since a large volume of ink does not overflow in the record area at one time, the spread at the color boundary on the plain paper is prevented. However, for the joint stripe due to the paper feed error and the density irregularity due to the scatter of nozzle in the recording head, the above patents do not directly effect to solve the problem but the problem of image deterioration remain unresolved.

In the following two patents which disclose a recording method shown in FIGS. 9A to 12C and which is an improvement over the above patents, the joint stripe is improved to some extent in addition to the effects described above. It is an effective method to solve the irregularity of image density due to the scatter of nozzles of a multi-nozzle head.

In FIG. 9A, numeral 91 denotes a multi-nozzle head which is shown as an 8-nozzle head 92 for simplification purpose. Numeral 93 denotes ink droplets discharged from the multi-nozzle head 92. It is desirable that the ink droplets are discharged in uniform volume and uniform direction as shown in FIG. 9A. If such discharge is attained, the dots of uniform size are impacted to the paper plane as shown in FIG. 9B and a uniform image without density irregularity is formed (FIG. 9C). In actuality, however, each nozzle has a variation as described above, and if the printing is done without countermeasure, the sizes and directions of the ink droplets discharged from the respective nozzles scatter as shown in FIG. 10A and they are impacted to the paper plane as shown in FIG. 10B in which white areas which do not meet the area factor of 100% are periodically present, or dots overlap unduly, or white stripes may be formed as shown at a center of FIG. 10B. The set of dots impacted under this condition has a density distribution to the direction of arrangement of nozzles as shown in FIG. 10C and it is recognized as the density irregularity by the observation of the human eye. In order to solve the problems on the image due to the scatter of the volume of discharge and the direction of discharge among the nozzles, a print control method called a split recording method to be described below has been proposed.

The method is explained with reference to FIGS. 11A to 12C. The multi-nozzle head 91 is scanned three times to complete the print area shown in FIGS. 9A to 10C, but the half thereof, that is, the 4-pixel area is completed in two passes. The eight nozzles of the multi-nozzle head are divided into an upper 4-nozzle group and a lower 4-nozzle group, and the number of dots printed by one nozzle in one scan is approximately one half of a regular image data, thinned in accordance with a predetermined image data array. In a second scan, dots are filled to the remaining half of the image data to complete the printing of 4-pixel areas. This recording method is called the split recording method.

By using the split record method, the printed image appears as shown in FIG. 11B because the affect to the print image inherent to the nozzle is halved even if the same recording head as that shown in FIGS. 10A to 10C is used, and the black stripe and the white stripe shown in FIG. 10B are rendered unobstructive. Accordingly, the density irregularity is also significantly reduced compared with FIGS. 10A to 10C, as shown in FIG. 11C.

In such recording, the image data for the first scan and the second scan are divided in accordance with the predetermined array so that they interpolate each other, and the image data array (thinning pattern) is usually a horizontally and vertically zig-zag pattern as shown in FIGS. 12A to 12C. Accordingly, in the unit print area (4-pixel unit area in the present example), the print is completed by the first scan to print the zig-zag pattern (or checked pattern) and the second scan to print the complementary zig-zag pattern (or reverse-checker pattern). FIGS. 12A, 12B and 12C show how the recording of a given area is completed by the 8-nozzle head as it is in FIGS. 9A to 11C by using the zig-zag pattern and the complementary zig-zag pattern.

In the first scan, the zig-zag pattern ○ is recorded by using the lower four nozzles (FIG. 12A). In the second scan, the paper is fed by four pixel length (½ of the head length) and the complementary zig-zag pattern ○ is recorded (FIG. 12B). In the third scan, the paper is again fed by four pixel length (½ of the head length) and the zig-zag pattern is recorded (FIG. 12C). In this manner, the paper feed of four pixel length and the recording of the zig-zag pattern and the complementary zig-zag pattern are alternately conducted to complete the 4-pixel record area for each scan.

FIGS. 13A to 13C show the effect of the split recording method to the joint stripe. FIG. 13A shows the recording at the first, second and third record areas. In FIGS. 8A to 8C, the image is completed in one record scan except the boundary area. In the boundary area, since the dots of the respective areas are overlapped in the printing of the opposite edges which occur at different times, the density increases at those areas. In FIGS. 13A to 13C, since the entire image area is recorded by overlapping the dots in two consecutive record scans, the same condition as that of the joint area of FIGS. 8A to 8C appears throughout the image. Accordingly, the joint area is less obstructive than FIGS. 8A to 8C. Further, since half of the pixels of the pixel trains following to the joint area are recorded by the nozzles at the center of the head, the scatter of the paper feed is also halved and the joint stripe is rendered unobstructive.

The above recording method is disclosed in Japanese Laid-Open Patent Application No. 60-107975 and U.S. Pat. No. 4,967,203 and the effect to the density irregularity and the joint stripe are described therein. In the former, it is described that "it is characterized by the provision of means for forming an overlapped portion by setting the paper feed in each main scan smaller than the width of the main scan so that two adjacent main scans overlap, and means for arranging the print dots of the overlapped portion such that they do not overlap in the two main scans." In this patent, the thinning mask is printed such that "the odd-numbered stage and the even-numbered stage of alternate columns are printed in a zig-zag pattern" in one instance, but it is printed such that the odd-numbered stage is printed in the first main scan and the even-numbered stage is printed in the second scan in other instance, and they are randomly printed in still another instance. Thus, the thinning mask and the paper feed width are not completely defined.

In the latter U.S. Pat. No. 4,967,203, it is disclosed that
"(a) alternate pixel positions which are not adjacent vertically and horizontally and which are in only upper half of a first band are printed in a first pass,
(b) pixels in the first band which were not printed in the first pass are printed in a second pass,
(c) pixels in the first band which were not printed in the first and second passes are printed in a third pass, and the first pass is conducted for the immediately following band". In this patent, the thinning mask for the split recording is limited to the alternate pixel array which are not adjacent horizontally and vertically.

In this patent, a pseudo pixel (super pixel) is formed by combining several pixels for tone expression or color expression and alternate thinning printing for horizontally and vertically non-adjacent pixels is conducted in the pseudo pixels (super pixel) block. In this method, it is described that "Once a system to implement the above method is built in a program software or a printer firmware, the program may be called by a color number of a combination designated for the super pixel, and the quality of print is improved without making a work to generate a computer program for generating a number of colors unduly complex". Thus, the simplification of the programming for the multi-color expression is recited as one of the effects. Since it is intended that each super pixel is sensed as one uniform color, it is stated that the spread of colors in the super pixel is harmless.

As described above, as the print is completed in one area by two different nozzles, the density irregularity and the joint stripe in the image area are avoided.

However, the above methods do not fully solve the problems.

In the split recording method shown in FIGS. 13A to 13C, the full image area is recorded in two scans and the same conditions as that of the joint area appear throughout the image and the joint area is not obstructive. In actuality, however, the printing is made in two continuous record scans, for example, the first image area is printed in the first record scan and the second record scan and the second image area is printed in the second record scan and the third record scan, but in the boundary area, the record is completed in the three continuous record scans, the first to third record scans. Accordingly, the boundary area has the joint overlapped in the two continuous scans, the second record scan and the third record scan, and the joint which is recorded in the first record scan and the third record scan which are spaced by one scan period and which is created by the fact that the bits recorded in the first record scan and the bits recorded in the third record scan are arranged obliquely. In the record by the two dots shown in FIG. 8B, it is known that the larger the difference of times of impact is, the higher is the density. Accordingly, in the joint area of FIGS. 13A to 13C, the joint area of the records of the first scan and the third scan shown by dark black has a higher density than other area.

Whenever the number of split records is increased, the relation of the time difference in the joint area is not corrected. So long as the record areas are recorded with the equal distribution in each record scan, for example, the zig-zag pattern and the complementary zig-zag pattern, the number of times of record scan in the joint area is necessarily one larger than that of other record area. This gap appears more or less and it is a cause of the degradation of the image. This phenomenon frequently appears in the high ink absorption speed coated paper.

SUMMARY OF THE INVENTION

It is an object of the present invention to provide an improved ink jet recording method.

It is another object of the present invention to provide an ink jet recording method which prevents a joint stripe and permits the recording of a high quality and smooth image.

It is another object of the present invention to provide an ink jet recording method which prints pixels located in a boundary area of each image area by as many simultaneous record scans as possible to prevent a paper feed joint stripe in the image area boundary due to a time difference of ink impact for even a recording medium having a relatively high ink absorption speed so that a high quality image is formed.

The above and other objects of the present invention will be apparent from the drawings and the following description.

BRIEF DESCRIPTION OF THE DRAWINGS

FIGS. 10A to 10C illustrate a print status of the ink jet printer having density irregularity;

FIGS. 11A to 11C illustrate a split recording;

DETAILED DESCRIPTION OF THE PREFERRED EMBODIMENTS

Figure 5:
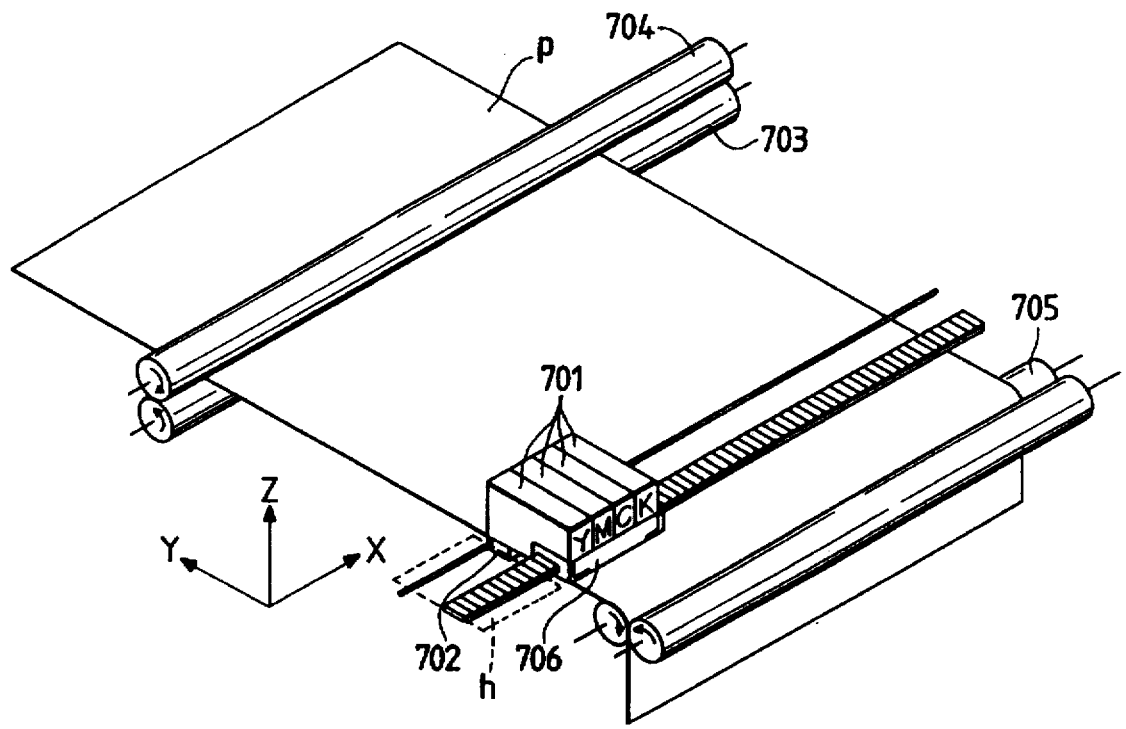
FIG. 5 shows a perspective view of an ink jet recording apparatus to which the present invention is applied.
Figure 6:
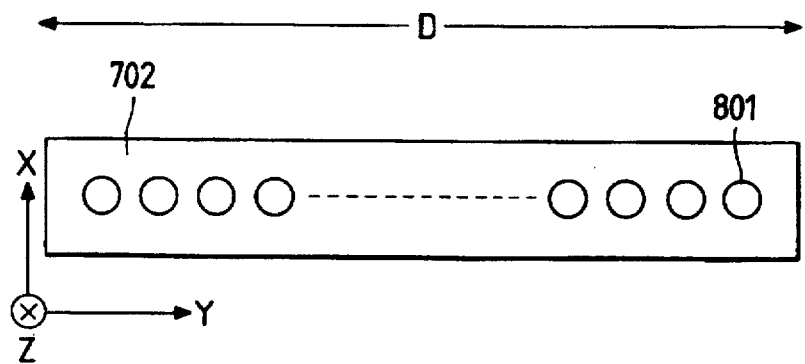
FIG. 6 shows a recording head.

FIG. 5 shows a perspective view of an ink jet recording apparatus to which the present invention is applied. In FIG. 5, numeral 701 denotes an ink cartridge which comprises ink tanks filled with inks of four colors, black (Bk), cyan (C) magenta (M) and yellow (Y) and a multi-nozzle head 702 for the respective colors. FIG. 6 shows multiple nozzles of the multi-nozzle head as viewed in the direction of z axis. Numeral 801 shows multiple nozzles arranged on the multi-nozzle head 702.

In FIG. 5, the multi-nozzles 801 are arranged in parallel to the Y axis although they may be sightly inclined on the XY plane. In this case, the head travels in the X direction while the nozzles print with offset timing.

Turning back to FIG. 5, numeral 703 denotes a paper transport roller which is rotated in a direction of arrow while it presses a print paper P with an auxiliary roller to transport the print paper P in the Y direction. Numeral 705 denotes a paper feed roller which feeds the print paper and also functions to press the print paper P as the paper transport roller 703 and the auxiliary roller 704 do. Numeral 706 denotes a carriage which carries four ink cartridges and moves them as the print proceeds. The carriage 706 stays at a home position h shown by a broken line when the printing is not performed or during a recovery operation of the multi-head.

In the present embodiment, the recording head of each ink jet cartridge discharges an ink droplet by causing a change in the state of ink by using thermal energy.

The four ink jet cartridges mounted on the carriage 706 are arranged to superimpose inks of black, cyan, magenta and yellow, in this sequence, when the carriage is reciprocally moved. Accordingly, in the return movement of the carriage, the inks are superimposed in the reverse sequence to that in the forward movement. Half-tone colors may be attained by appropriately superimposing the ink dots of the respective colors C, M and Y. Namely, red is attained by superimposing M and Y, blue by C and M, and green by C and Y.

Usually, black is attained by superimposing three colors C, M and Y but the black is separately printed because the color of black created by the three colors is poor, edging of a color appears because of the difficulty in precisely superimposing the three colors and the ink impact density per unit time is too high.

Figure 7:
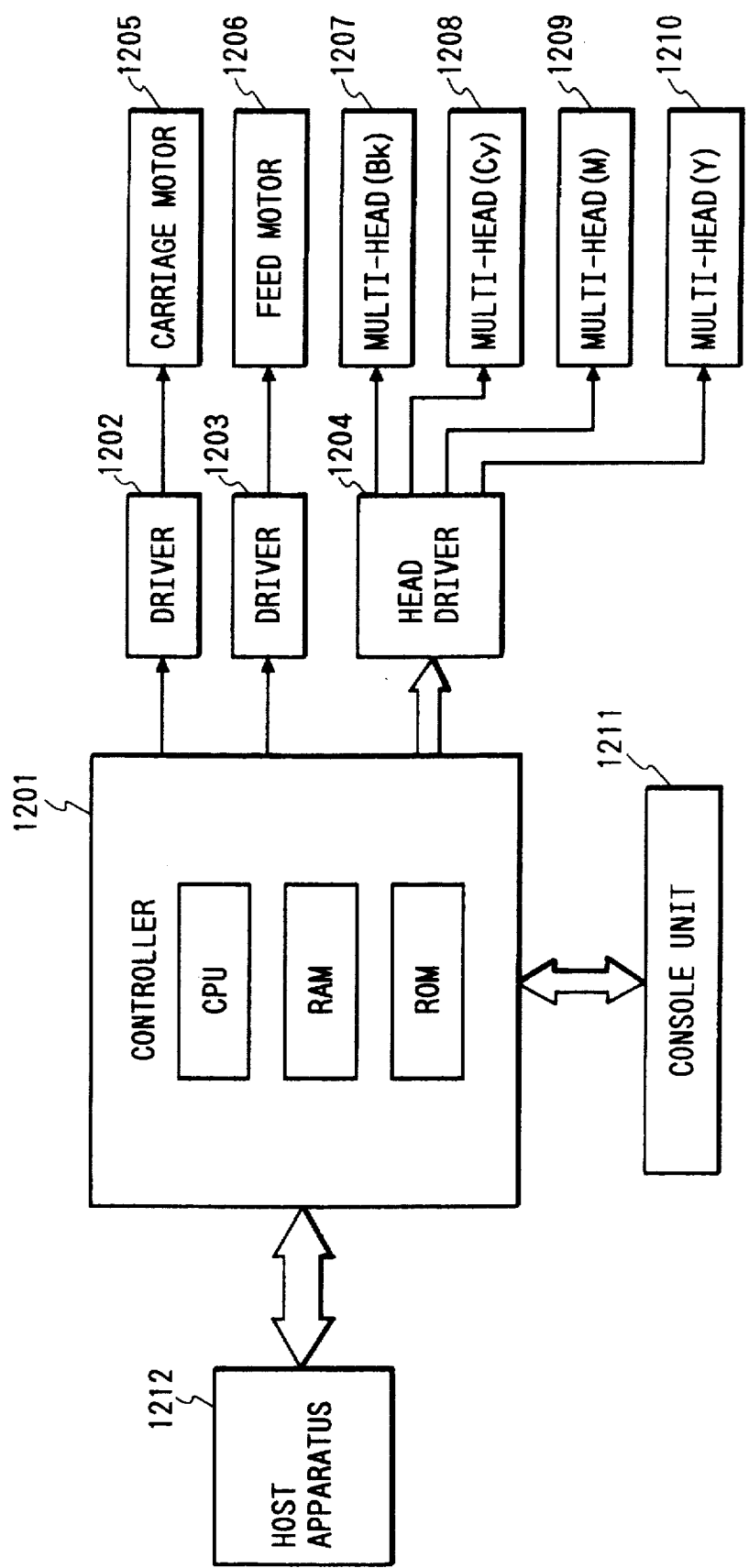
FIG. 7 shows a block diagram of a control unit of the ink jet recording apparatus shown in FIG. 5.

FIG. 7 shows a block diagram of a control unit of the ink jet recording apparatus shown in FIG. 5. In FIG. 7, numeral 1201 denotes a control unit which comprises a CPU, a ROM and a RAM and it controls the respective units in accordance with a program stored in the ROM. Numeral 1202 denotes a driver for driving a carriage motor 1205 which drives the carriage 706 in the x direction (main scan) in accordance with a signal from the control unit 1201, numeral 1203 denotes a driver for driving a paper feed roller 705 and a paper transport roller 703 and driving a transport motor 1206 which transports a recording medium in the y direction (sub-scan) in accordance with a signal from the control unit 1201, numeral 1204 denotes a driver for driving multi-heads 1207-1210 for the respective colors (corresponding to 702 in FIG. 5) in accordance with print data from the control unit 1201, numeral 1211 denotes a console display unit for key entering various data and displaying various data, and numeral 1212 denotes a host unit for supplying the print data to the control unit 1201.

The carriage 706 is at the position h (home position) shown in FIG. 5. When a print command is issued, it is forwardly moved in the x direction so that the printing is made on the paper by the n multi-nozzles 801 on the multi-head 702. When the printing of the data up to the end of paper is completed, and the multi-head reaches the reversal point, the carriage starts the return movement toward the home position and the data is printed again. After the end of the first printing in the forward movement of the carriage and before the return movement of the carriage, the paper transport roller 703 is rotated in the direction of arrow to transport the paper in the y direction in accordance with the width of the record area. In the split recording to be described later, the paper feed length is 1/m of the width which is recorded by n multi-nozzles, where m (m≧2) is the number of splits. By repeating the print by the multi-head and the paper feed (sub-scan) in accordance with the scan (main scan) of the carriage, the printing of data on one sheet is completed.

A specific embodiment of the recording method by the ink jet recording apparatus thus constructed is explained below.

<First Embodiment>

Figure 1:
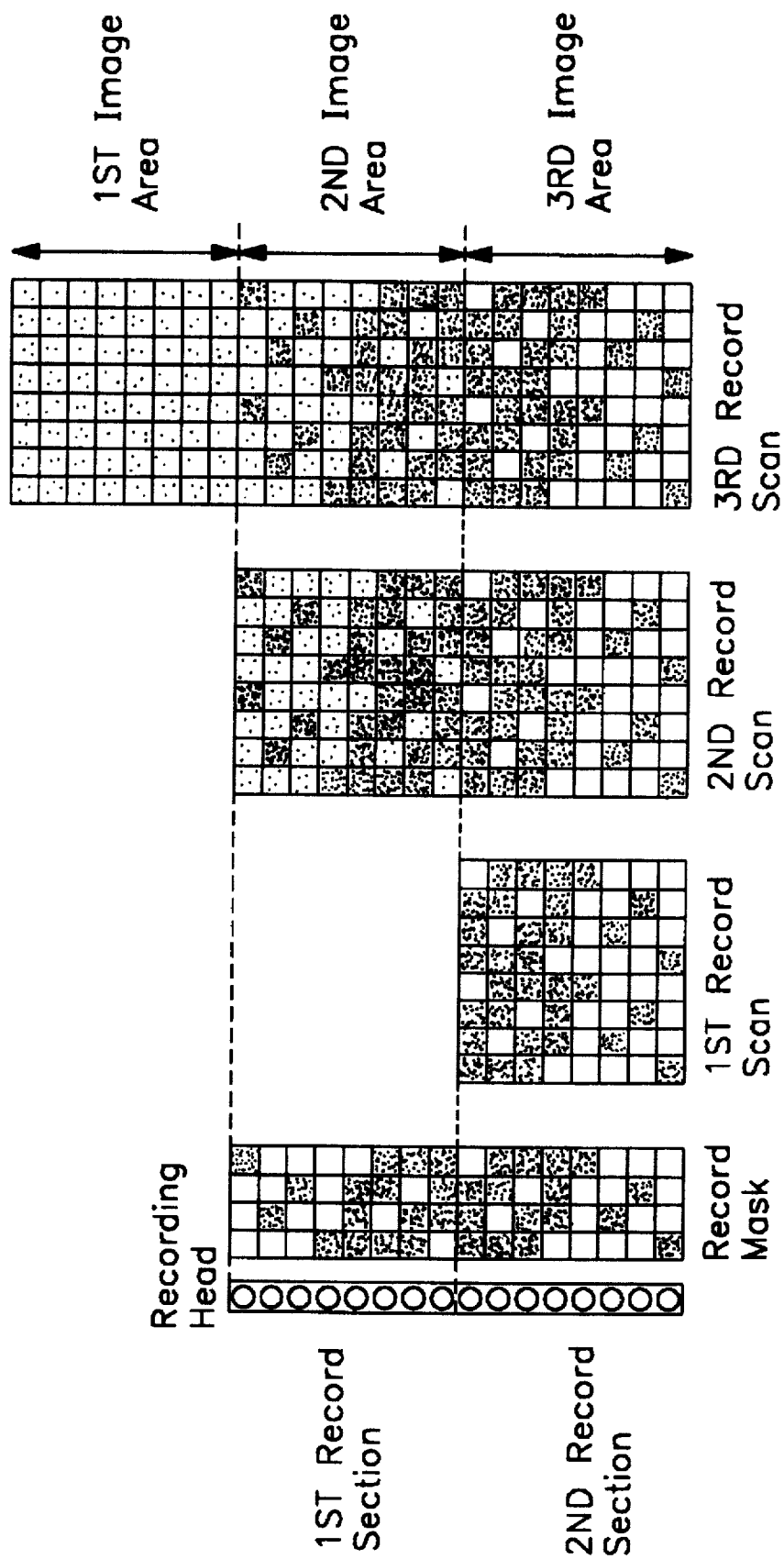
FIG. 1 illustrates a record status in a first embodiment.

A first embodiment is explained. FIG. 1 shows a print status when the printing is made by a head having 16 nozzles. In the present embodiment, the nozzles arranged in the head are equally divided into two record sections or areas and each area always uses the same thinning mask. FIG. 1 shows a record status of the present embodiment. The head having 16 nozzles on the left side of FIG. 1 is divided into two sections or areas as shown. A mask shown on the right corresponds to each nozzle which is recorded in accordance with this mask in all scans. In each record scan, the thinned printing is made for the unit image area at a predetermined print factor of 50%. The image record status is shown on the right. The dark solid pixel shows that it is recorded in each record scan, and the gray pixel shows that it has been recorded in the previous scan.

In the second record area in which the first recording is made for each image area, the print factor at the leading edge of the paper feed is high (75%) and low (25%) at the trailing edge. In the first record area which is complementary to the second record area, the print factor at the leading edge is low (25%) and high (75%) at the trailing edge. In the printing done for each image area in accordance with such record mask, the area of higher record factor is first printed in the first record scan and the area having the lower record factor is later recorded in the second scan. In this record status, since 75% of the pixels in the boundary of the first image area and the second image area are simultaneously recorded, the joint stripe due to the time difference of the record scan do not substantially appear in this area.

Figure 2:
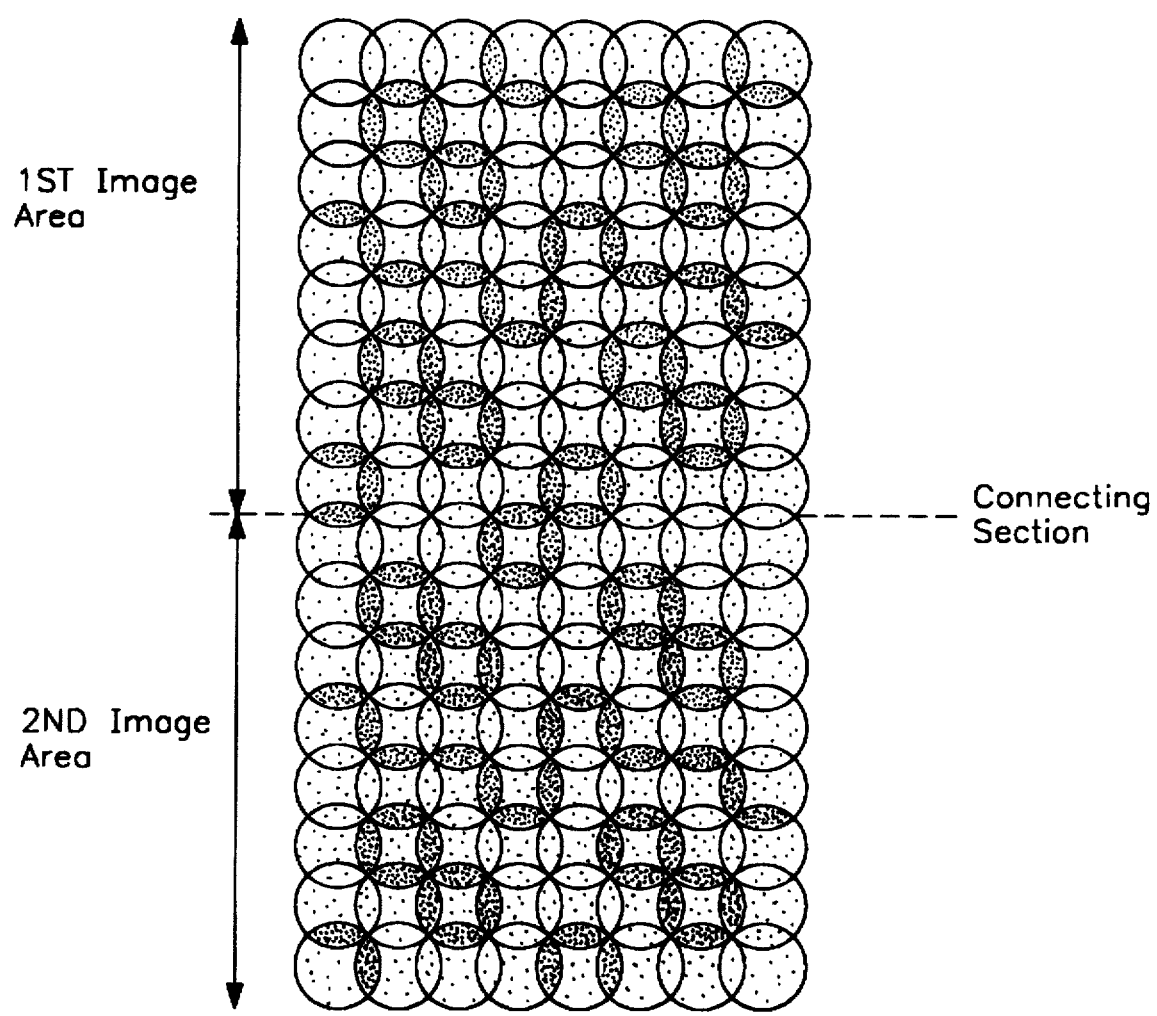
FIG. 2 illustrates the occurrence of a joint stripe in the first embodiment.
Figure 8A:
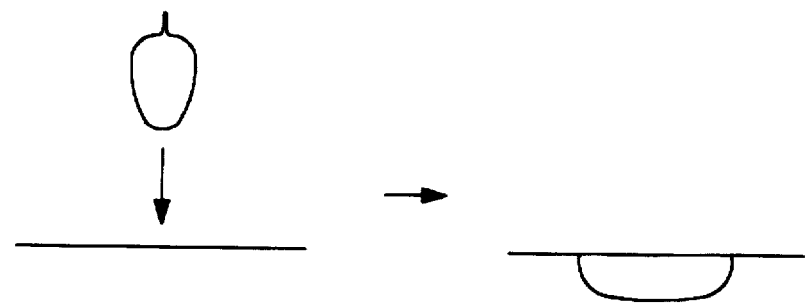
FIGS. 8A to 8C illustrate a principle of the occurrence of the joint stripe.
Figure 8B:
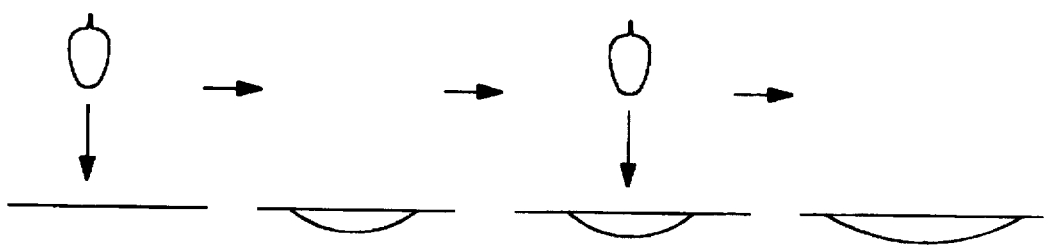
Figure 8C:
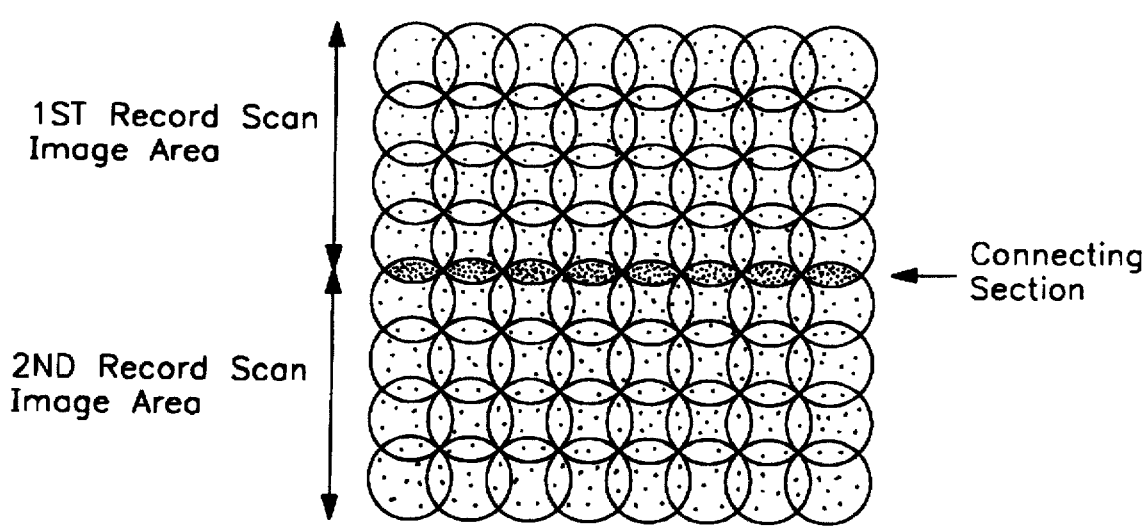
Figure 9C:
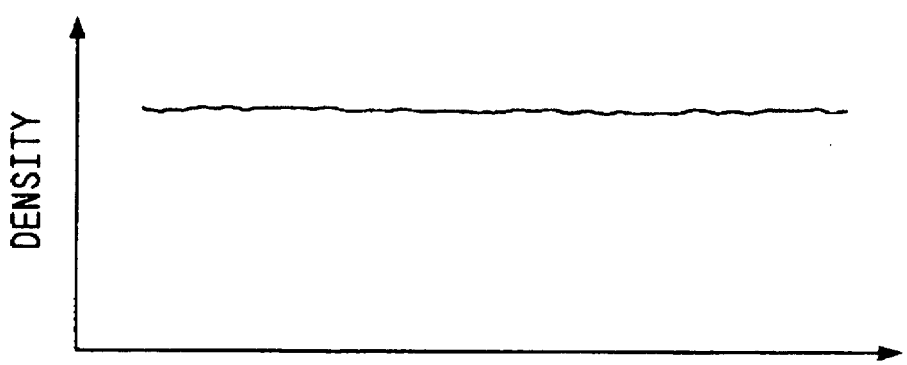
FIGS. 9A to 9C show an ideal print status of the ink jet printer.
Figure 9B:
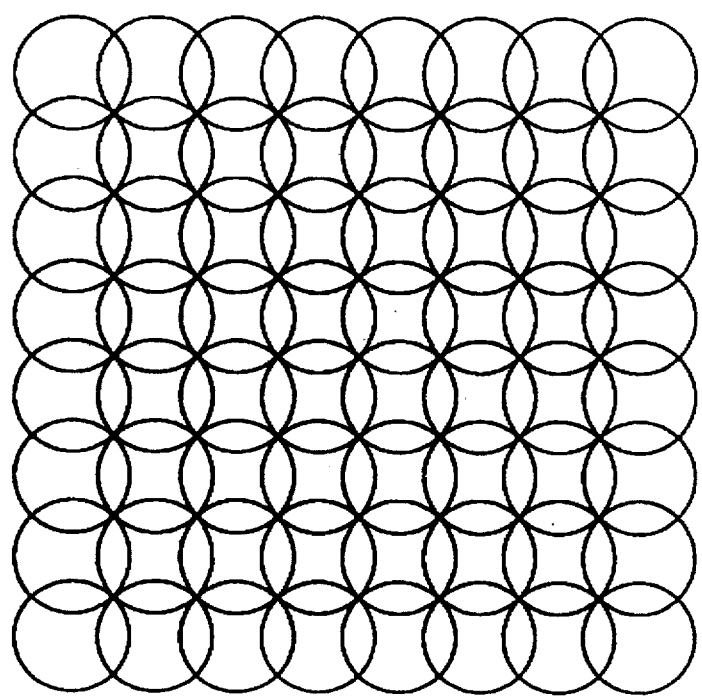
Figure 9A:
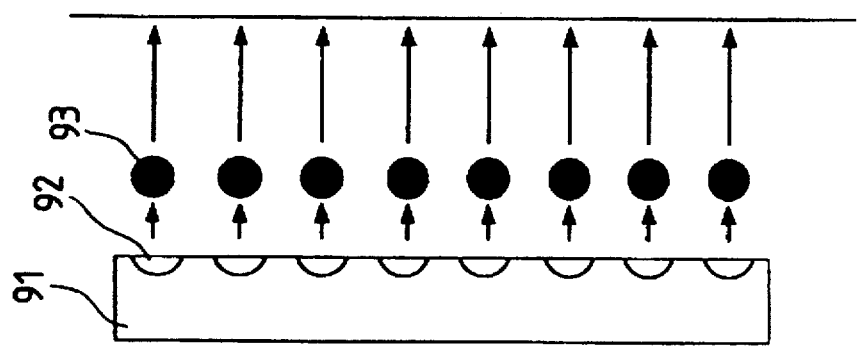
Figure 12A:
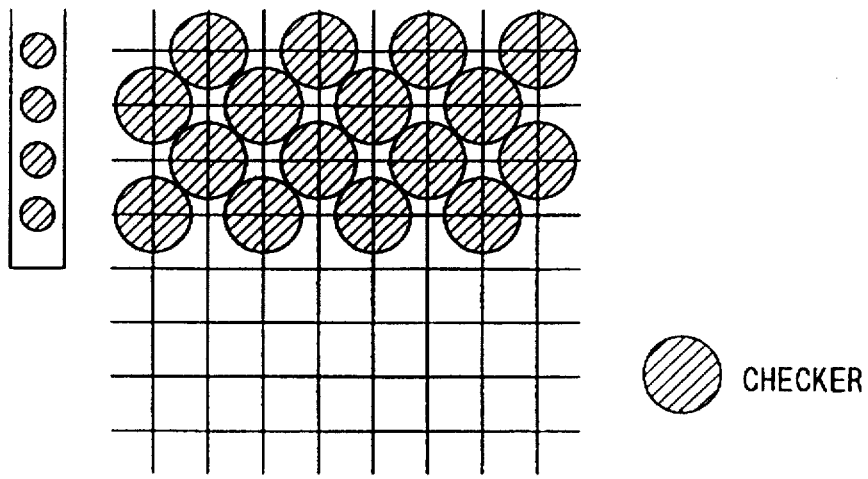
FIGS. 12A to 12C illustrate a print status by the split recording.
Figure 12B:
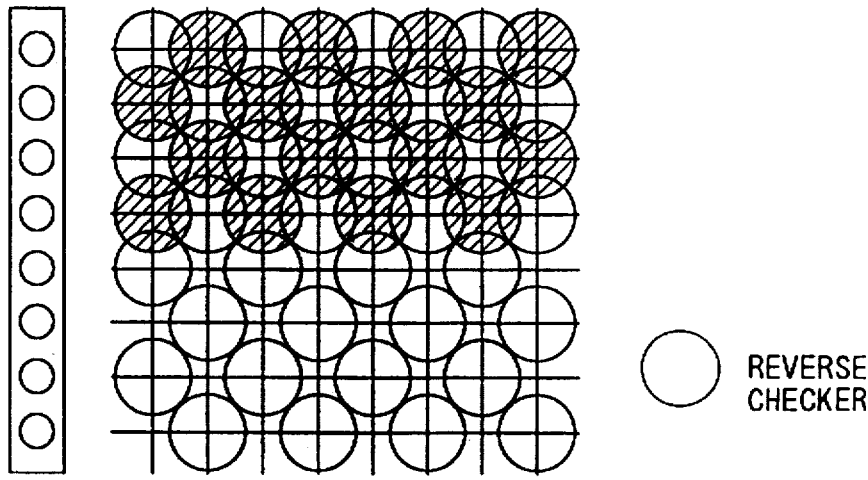
Figure 12C:
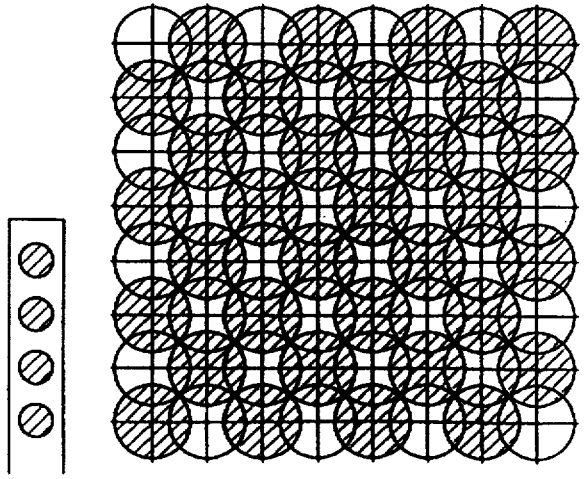
Figure 13A:
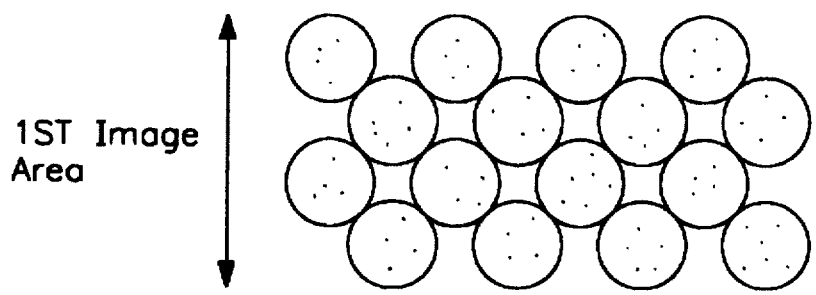
FIGS. 13A to 13C illustrate a principle of the occurrence of the joint stripe in the 2-pass split recording.
Figure 13B:
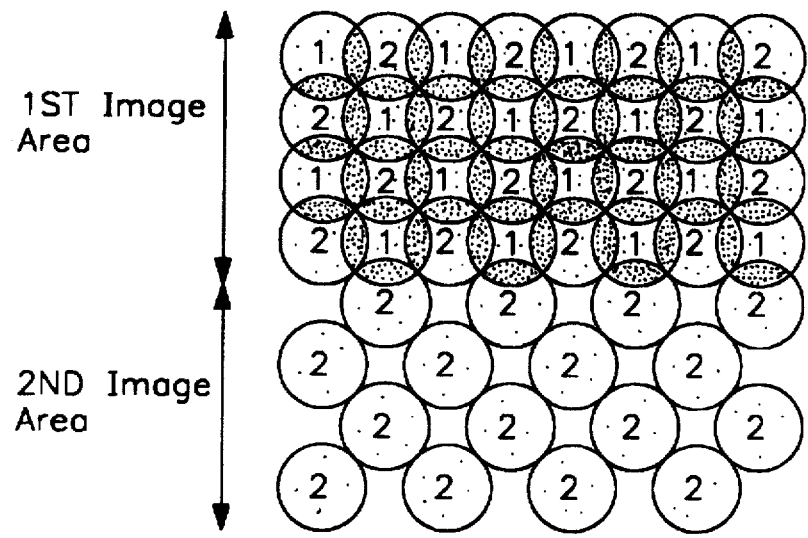
Figure 13C:
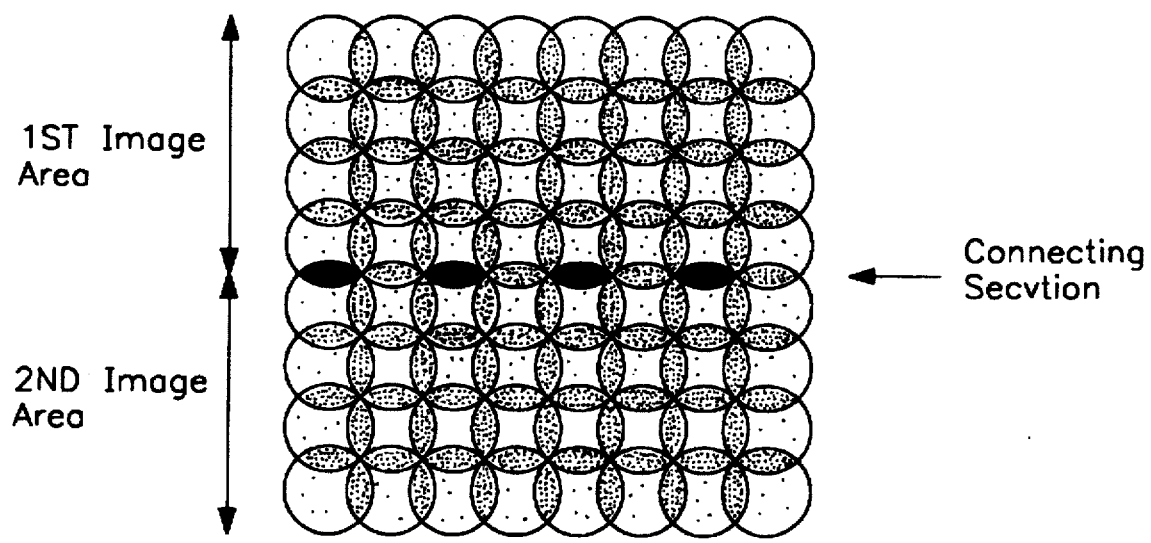

FIG. 2 shows the joint area which appears by the time difference of the record scan, of the image recorded by the present embodiment. The overlapped area of the dots recorded in the different scans is emphasized by black. A broken line shows a paper feed joint area. In the prior art shown in FIG. 8C, the high density areas which appear due to the time difference of the record scan are concentrated in the paper feed joint area. In the present embodiment, they are uniformly distributed to each image area.

In accordance with the present embodiment, the division factor of the pixel lines is not uniform in the nozzle main scan direction. Accordingly, the scatter of a nozzle may be harder to be resolved compared to the conventional split recording method. However, since they are recorded by other nozzle at a rate of ¼, the effect of the split recording method is not totally lost.

In accordance with the present embodiment, the recording head is split into two record areas and each image area is recorded in two record scans. In the first record scan of each image area, the upper (the forward paper feed direction) print factor is high and the lower (the backward paper feed direction) print factor is low. In the second record scan, the upper print factor is low and the lower print factor is high. In this manner, the pixels arranged in the boundary area are recorded by as many simultaneously recording scans as possible to render the joint stripe caused by the time difference of the print to be less obstructive so that a uniform and high quality image is formed.

<Second Embodiment>

Figure 3:
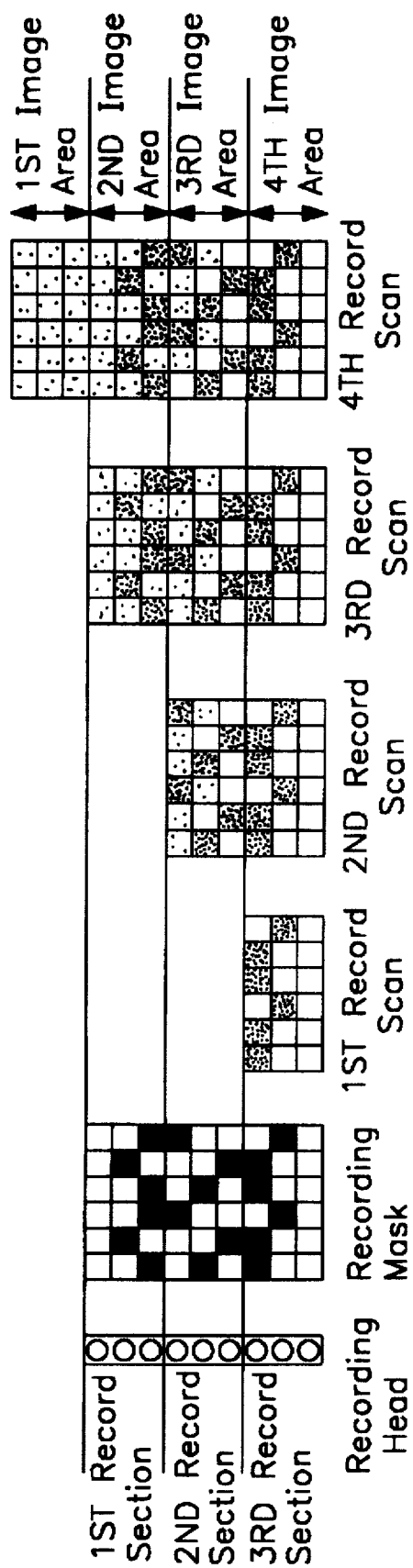
FIG. 3 illustrates a record status in a second embodiment.
Figure 4:
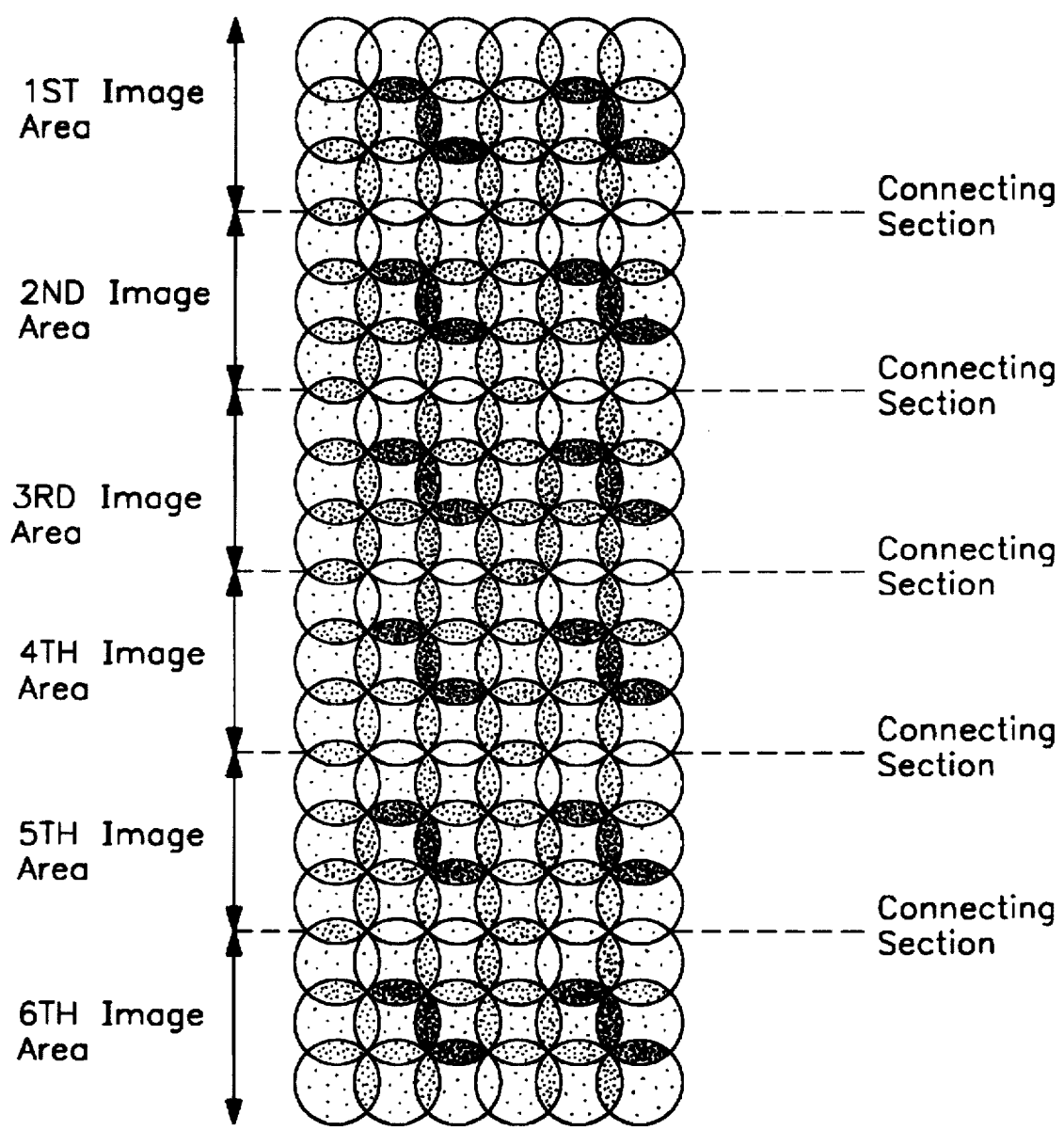
FIG. 4 illustrates the occurrence of the joint stripe in the second embodiment.

A second embodiment is now explained. The present embodiment relates to a 3-pass split recording method, and unlike the first embodiment, it is an improved recording method of the first embodiment. FIG. 3 shows an image formation status of the present embodiment. In the present embodiment, the head record scan is done three times for the unit image area. The nozzles of the head are divided into three for the record areas. Like the first embodiment, each record area uses the fixed thinning mask, and the paper is fed by ⅓ head width for each record scan. The print status of the paper feed joint area of the present embodiment is shown in FIG. 4, like the first embodiment. In the present embodiment, since one image area is completed in three record scans, there are three types of dot overlap timings of the image area. The overlap area resulting from two consecutive scans such as the first and second scans or the second and third scans is shown by grey, and the overlap area resulting from the alternate record scans such as the first and third scans is shown by dark black. As seen from FIG. 4, the overlap areas are uniformly distributed throughout the image area, as they are in the first embodiment. In the present embodiment, the uniform image with unobstructive joint area is formed, as it is in the first embodiment.

In the present embodiment, since the period is 3-pixel length in the main scan direction, it is hard to be tuned with the input binarized image data having a period which is normally a multiple of 2, and the image data of any duty can be split-recorded by two types of nozzles. Since the entire unit image area is completed in three record scans at the print factor of ⅓ to that of the first embodiment and the opposite end areas are completed in two record scans with the print factors of ⅓ and ⅔, respectively, the color boundary spread on the paper surface such as the plain paper is further improved and the density is further enhanced as a whole.

In the present embodiment, the ink jet recording apparatus which forms the flying droplet by using the thermal energy is used for the ink jet recording system. Typical construction and principle thereof are preferably those disclosed in U.S. Pat. No. 4,723,129 and U.S. Pat. No. 4,740,796. It is applicable to either an on-demand type or a continuous type. In case of the on-demand type, at least one drive signal for causing rapid temperature rise beyond nucleate boiling in accordance with the record information is applied to an electro-thermal transducer arranged for a sheet which holds liquid (ink) or a liquid path so that a thermal energy is generated in the electro-thermal transducer and bubbles are formed in the liquid (ink) which corresponds to the drive signal. The liquid (ink) is discharged through a discharge port by the growth and contraction of the bubble to form at least one droplet. When the drive signal is pulsive, the growth and constraction of the bubble are instantly and properly effected and the highly responsive discharge of the liquid (ink) is attained.

The pulsive drive signal is preferably one disclosed in U.S. Pat. No. 4,463,359 and U.S. Pat. 4,345,262. When the condition described in U.S. Pat. No. 4,313,124 relating to the temperature rise on the thermal action plane is adopted, improved recording is attained.

The recording head may be a combination (linear liquid path or transverse liquid path) of the discharge port, the liquid path and the electro-thermal transducer, as disclosed in the above-mentioned patents, or those disclosed in U.S. Pat. No. 4,558,333 and U.S. Pat. No. 4,459,600.

In addition, a construction disclosed in Japanese Laid-Open Patent Application No. 59-123670 in which a slit common to a plurality of electro-thermal transducers is used as a discharge port of the electro-thermal transducers, or Japanese Laid-Open Patent Application No. 59-138461 in which an opening for absorbing a pressure wave of thermal energy is provided for the discharge port may be used.

Further, in a full line type recording head having a length corresponding to a maximum recording medium width which the recording apparatus can record, the length may be met by a combination of a plurality of recording heads as disclosed in the above-mentioned patents or by an integrally constructed recording head.

In addition, the present invention is also effective to a replaceable chip type recording head which permits electrical connection with the main unit of the apparatus and the supply of ink from the main unit of the apparatus, and a cartridge type recording head having an ink tank integrally mounted on the recording head.

The addition of the recovery means and auxiliary means to the recording head is preferable as they further stabilize the effect of the present invention. Specifically, they are capping means for the recording head, cleaning means, pressure or suction means, pre-heating means including an electro-thermal transducer, a separate heating element or a combination thereof. A preliminary discharge mode for discharging separately from the recording is effective for stable recording.

In the present embodiment, the ink is used as the liquid. The ink may solidify at or below a room temperature or it may be softened at a room temperature or may be liquid. In the ink jet system, the ink which is of liquid phase when the record signal is applied may be used because it is common to control the ink within a range of 30° C. to 70° C. to keep the viscosity of the ink within a stable discharge range.

In addition, the temperature rise by the thermal energy may be used as the energy of the status change from the solid state to the liquid state of the ink, or the ink which is solidified when it is left to prevent the evaporation of the ink may be used. The ink may be liquidified by the application of the thermal energy in accordance with the recording signal and may be discharged as liquid ink, or it may start to be solidified when it arrives at the recording medium and solidified by the thermal energy. In this case, the ink may be held in porous sheet recesses or through-holes in liquid or solid state and arranged to face the electro-thermal transducer, as disclosed in Japanese Laid-Open Patent Application No. 54-56847 or Japanese Laid-Open Patent Application No. 60-71260. In the present invention, the execution of the film boiling system is most effective to the inks described above.

In addition, the recording apparatus of the present invention may be an image output terminal of an information processing apparatus such as a word processor and a computer, whether it is integral or separate, or a copying machine combined with a reader, or a facsimile machine having a transmission and reception function.

The present invention is applicable not only to the ink jet system which utilizes the thermal energy but also the ink jet system which utilize a piezoelectric element.

What is claimed is:

1. an ink jet recording method for recording an image on a recording medium by main scanning a recording head having a plurality of ink discharge elements arranged thereon in a direction other than the direction of arrangement of said ink discharge elements and relatively moving said recording head and said recording medium in a sub-scan direction different from the main scan direction, said method comprising the steps of:

dividing a record area of a recording head into a plurality of divided record areas;

main scanning an image area on the recording medium a plurality of times by using different divided record areas of the recording head; and sequentially recording thinned images of a predetermined print factor to form to form image area portions in each main scan to complete an image of the image area, with a boundary area being formed at each juncture of adjacent image area portions;

wherein a number of pixels recorded in a boundary area of adjacent image area portions of the image area in at least one main scan is less than a number of pixels recorded in the boundary area in another main scan.

2. An ink jet recording method according to claim 1, wherein a sub-scan of a width of the divided record areas of the recording head is conducted at each end of the main scan.

3. An ink jet recording method according to claim 1, wherein a color image is recorded on the recording medium by using a plurality of recording heads of different colors.

4. An ink jet recording method according to claim 3, wherein the plurality of heads are arranged in the main scan direction.

5. An ink recording method according to claim 1, wherein the recording head discharges an ink droplet from a discharge port by causing a change in an ink state by using thermal energy.

6. An ink jet recording method according to claim 2, wherein the recording head discharges an ink droplet from a discharge port by causing a change in an ink state by using thermal energy.

7. An ink jet recording method according to claim 3, wherein each of the plurality of recording heads discharges an ink droplet from a discharge port by causing a change in an ink state by using thermal energy.

8. An ink jet recording method according to claim 4, wherein each of the plurality of recording heads discharges an ink droplet from a discharge port by causing in an ink state by using thermal energy.

9. An ink jet recording method according to claim 1, wherein a print factor for pixels in the boundary area of adjacent image area portions of the image area in a first main scan is different from a print factor in the boundary area in a second main scan.

10. An ink jet recording method according to claim 1, wherein a print factor for pixels in the boundary area of adjacent image area portions of the image area in at least one main scan is different from the predetermined print factor.

* * * * *

UNITED STATES PATENT AND TRADEMARK OFFICE
CERTIFICATE OF CORRECTION

PATENT NO. : 5,696,542

DATED : December 9, 1997

INVENTOR(S): MIYUKI MATSUBARA, ET AL.

It is certified that error appears in the above-identified patent and that said Letters Patent is hereby corrected as shown below:

TITLE PAGE:

<u>REFERENCES CITED</u>  [56]

<u>U.S. Patent Documents</u>

"Nagashi et al." should read --Nagoshi et al.--.

<u>Foreign Patent Documents</u>

"401026260   1/1989   Japan" should read
--1-26460   1/1989   Japan--.

<u>COLUMN 3</u>

Line 8, "remain" should read --remains--.
Line 10, "is" should read --are--.

<u>COLUMN 4</u>

Line 63, "are" should read --is--.

UNITED STATES PATENT AND TRADEMARK OFFICE
CERTIFICATE OF CORRECTION

PATENT NO.   :  5,696,542

DATED        :  December 9, 1997

INVENTOR(S)  :  MIYUKI MATSUBARA, ET AL.

It is certified that error appears in the above-identified patent and that said Letters Patent is hereby corrected as shown below:

COLUMN 9

Line 26, "constraction" should read --contraction--.

Signed and Sealed this

Thirty-first Day of August, 1999

*Attest:*

Q. TODD DICKINSON

*Attesting Officer*    Acting Commissioner of Patents and Trademarks